(12) United States Patent
Willems

(10) Patent No.: US 10,024,383 B2
(45) Date of Patent: Jul. 17, 2018

(54) ROTARY DAMPER

(71) Applicant: AUDI AG, Ingolstadt (DE)

(72) Inventor: Marco Willems, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/313,403

(22) PCT Filed: May 5, 2015

(86) PCT No.: PCT/EP2015/000913
§ 371 (c)(1),
(2) Date: Nov. 22, 2016

(87) PCT Pub. No.: WO2015/176797
PCT Pub. Date: Nov. 26, 2015

(65) Prior Publication Data
US 2017/0130803 A1 May 11, 2017

(30) Foreign Application Priority Data
May 23, 2014 (DE) .................... 10 2014 007 844

(51) Int. Cl.
*F16F 15/03* (2006.01)
*F16F 13/02* (2006.01)
(Continued)

(52) U.S. Cl.
CPC ............ *F16F 15/035* (2013.01); *B60G 13/02* (2013.01); *F16F 15/005* (2013.01);
(Continued)

(58) Field of Classification Search
None
See application file for complete search history.

(56) References Cited

U.S. PATENT DOCUMENTS 8,573,604 B2   11/2013 Willems
9,080,649 B2   7/2015 Willems
(Continued)

FOREIGN PATENT DOCUMENTS

CN   102695621    9/2012
DE   199 19 279   11/2000
(Continued)

OTHER PUBLICATIONS

English International Search Report issued by the European Patent Office in International Application PCT/EP2015/000913.
(Continued)

*Primary Examiner* — Bradley T King
*Assistant Examiner* — James K Hsiao
(74) *Attorney, Agent, or Firm* — Henry M. Feiereisen LLC

(57) ABSTRACT

A rotary damper that is to be fastened to a first mass via a fastening part (10) comprises a damper housing (2) surrounding an electromagnetic damper motor (4) which is disposed along a central axis of the rotary damper, a hinged lever 14) connected to a second mass, and a gearing (14) for transmitting and/or converting a relative rotation between the masses to the damper motor (4) such that vibrations are dampened. The fastening part (10) is connected to a bearing part (38) via an elastomer bearing (44), the damper motor (4) being disposed on said bearing part (38), and the damper housing (2) is connected to the hinged lever (14), which is mounted so as to be able to rotate relative to the bearing part (38).

9 Claims, 3 Drawing Sheets

(51) Int. Cl.
*F16F 15/00* (2006.01)
*B60G 13/02* (2006.01)

(52) U.S. Cl.
CPC .... *B60G 2202/22* (2013.01); *B60G 2204/419* (2013.01); *B60G 2206/41* (2013.01); *B60G 2600/26* (2013.01); *F16F 2222/06* (2013.01)

(56) References Cited

U.S. PATENT DOCUMENTS

| | | | |
|---|---|---|---|
| 9,120,361 B2 | 9/2015 | Willems | |
| 9,136,743 B2 | 9/2015 | Willems | |
| 9,193,239 B2 | 11/2015 | Willems | |
| 9,300,188 B2 | 3/2016 | Willems | |
| 9,353,826 B2 | 5/2016 | Willems | |
| 9,397,545 B2 | 7/2016 | Willems | |
| 9,415,655 B2 | 8/2016 | Willems | |
| 9,446,650 B2 | 9/2016 | Willems | |
| 2007/0261516 A1* | 11/2007 | Saito | F16H 49/001 74/640 |
| 2009/0299480 A1* | 12/2009 | Gilbert | A61F 2/582 623/18.11 |
| 2013/0049508 A1 | 2/2013 | Willems | |
| 2013/0154404 A1 | 6/2013 | Willems | |
| 2014/0165758 A1* | 6/2014 | Moune | F16H 49/001 74/412 R |
| 2014/0217663 A1 | 8/2014 | Willems | |
| 2014/0285043 A1 | 9/2014 | Willems | |
| 2014/0300072 A1* | 10/2014 | Willems | B60G 7/02 280/124.1 |
| 2014/0360825 A1* | 12/2014 | Willems | B60G 13/16 188/292 |
| 2015/0159730 A1 | 6/2015 | Willems | |
| 2015/0251513 A1* | 9/2015 | Willems | B60G 11/18 267/195 |
| 2015/0306933 A1 | 10/2015 | Willems | |

FOREIGN PATENT DOCUMENTS

| | | |
|---|---|---|
| DE | 1 354 731 A1 | 10/2003 |
| DE | 10 2006 061 984 B3 | 2/2008 |
| DE | 602 26 122 T2 | 5/2009 |
| DE | 10 2009 048 818 A1 | 4/2011 |
| DE | 10 2011 009 608 A1 | 8/2012 |
| DE | 10 2011 102 743 A1 | 11/2012 |
| EP | 1 354 731 A1 | 10/2003 |

OTHER PUBLICATIONS

Chinese Search Report dated Jan. 12, 2018 with respect to counterpart Chinese patent application 2015800263315.
English translation of Chinese Search Report dated Jan. 12, 2018 with respect to counterpart Chinese patent application 2015800263315.

* cited by examiner

ROTARY DAMPER

CROSS-REFERENCES TO RELATED APPLICATIONS

This application is the U.S. National Stage of International Application No. PCT/EP2015/000913, filed May 5, 2015, which designated the United States and has been published as International Publication No. WO 2015/176797 and which claims the priority of German Patent Application, Serial No. 10 2014 007 844.2, filed May 23, 2014 pursuant to 35 U.S.C. 119(a)-(d).

BACKGROUND OF THE INVENTION

The invention relates to a rotary damper.

DE 10 2009 048 818 A1 discloses an electric damper for damping the relative movement between first and second masses, including a generator driven by the mass movement, with the generator being integrated in a gearing having a first gear element, which forms a stator and is caused to rotate by the mass movement, and a second gear element which forms a rotor and which is directly or indirectly coupled to the first gear element with a gear ratio and rotated by the first gear element, wherein either the first or the second gear element is provided with means for generating a magnetic field.

In the DE 10 2009 048 818 A1, the torque support of the rotary damper is realized via two fixed screw-connection points to the body as one of the two masses. Both screw-connection points must have hereby a minimum support width for supporting the torque. At the same time, the support of the rotary damper relative to the body should be elastic. Because of the forces introduced by the lever arms and governed by the support width, it is difficult to adjust and suit the rigidity and dimensioning of the elastic support of the rotary damper on the body.

DE 602 26 122 T2 relates to an arrangement for damping control in a vehicle suspension, wherein a suspension arrangement for each wheel includes at least two linkages connecting a wheel to a vehicle chassis, and wherein a torsion spring unit is part of one of the linkages. The suspension further includes a leaf spring. The torsion spring unit includes an adjustable torsion spring, an actuator arranged so as to act on the torsion spring, and a rotary damper interconnected with the torsion spring by an attachment section. The rotary damper and the torsion spring are connected to the chassis, and the attachment section is connected to the linkage. The actuator is arranged such as to bias the torsion spring and to urge the leaf spring to seek a predetermined position and to damp vibrations in the suspension relative to the predetermined position.

SUMMARY OF THE INVENTION

The invention is based on the object to provide a rotary damper, in which the elastic support of the rotary damper on the body (one of the two masses) in terms of rigidity and dimensioning is easy to adjust and to adapt.

For this purpose, the rotary damper according to the invention to be fastened via a fastening part to a first mass, includes a damper housing in surrounding relationship to an electro-magnetic damper motor arranged along a central axis of the rotary damper, an articulated lever which is connected to a second mass, and a gearing for transmitting and/or converting a relative rotation movement between the masses onto the damper motor for vibration damping, with the fastening part being connected via an elastomer bearing to a bearing part on which the damper motor of the rotary damper is arranged, wherein the damper housing is connected to the articulated lever which is rotatably mounted relative to the bearing part.

As a result of this configuration of the fastening part and the bearing part, the rotary damper according to the invention enables that instead of two screw-connection points, only one central screw-connection point is realized by the fastening part so as to avoid the adverse influence that the minimum support width has upon the design possibility of the elastic damping.

According to an advantageous embodiment, the rotary damper according to the invention is characterized in that the fastening part includes an outside bearing surface which extends about the axis, and that the bearing part has an inside bearing surface which extends about the axis, with the elastomer bearing being located between the inside bearing surface on the bearing part and the outside bearing surface on the fastening part. As a result of this arrangement of the bearing surfaces, forces are introduced in an advantageous manner evenly about the circumference into the elastomer bearing.

According to a further advantageous embodiment, the rotary damper according to the invention is characterized in that the fastening part has a base plate and a cup-shaped base plate extension which projects from the base plate in direction of the axis, i.e. axially, and which has a radial bottom portion and an axial side wall portion which includes the bearing surface. It is hereby particularly advantageous, when the bearing part includes an axially extending bearing collar with a radial bottom portion and an axial side wall portion which forms the inside bearing surface and has a bearing portion, which extends along the base plate, and an axially extending bearing wall which adjoins the bearing portion, for rotatably mounting the articulated via a roller bearing. As a result of this configuration of the fastening part and the bearing part, a structurally simple and stable solution is provided in an advantageous manner so as to reliably accommodate the elastomer bearing in the rotary damper. In addition, the axially extending bearing wall of the bearing part realizes a reliable support of the articulated lever with the attached parts upon the bearing part.

According to a further advantageous embodiment, the rotary damper according to the invention is characterized in that the inside bearing surface of the bearing part is formed on the bearing part and the outside bearing surface is formed on the fastening part, whereas the elastomer bearing is oval-shaped in cross section perpendicular to the axis. The oval configuration of the elastomer bearing results in a torque support, with a certain movement being possible between the fastening part and the bearing part; however, an excessive pivoting of the two parts pivot in relation to one another is counteracted by a respective force applied by the outside bearing surface on the fastening part against the inside bearing surface on the bearing part.

According to a further advantageous embodiment, the rotary damper according to the invention is characterized in that the electromagnetic damper motor includes a rotor and a stator as well as means for generating a magnetic field at the rotor and the stator, with the rotor being rotatably mounted in the damper housing in coaxial relation thereto, and the stator being fixed to the damper housing. Such an electromagnetic damper motor is particularly suitable for integration with the rotary damper according to the invention, since it can be arranged on the bearing axle upon the bearing part, so that vibration-caused stress can be kept at a minimum by the rotary damper.

According to a further advantageous embodiment, the rotary damper according to the invention is characterized in that the bearing part includes a bearing axle which is connected to the bottom portion of the bearing part, for support of the damper motor. Thus, the bearing part not only fulfills the function as component of the rotary damper that is responsible for the elastic support by the elastomer bearing, but also an advantageous support of the damper motor without additional constructional costs, by forming the bearing axle in one piece with the bearing part.

According to a further advantageous embodiment, the rotary damper according to the invention is characterized in that the gearing is a strain wave gear which has a rigid unit with internal teeth, and a flexible unit with external teeth, and an oval wave generator which is rotatably mounted in the flexible unit and through rotation deforms the flexible unit, with the two units of the gearing being coupled with one another by form fit via the teeth. The strain wave gear is suitable advantageously for integration with the rotary damper according to the invention, because of the space-saving arrangement thereof between the damper motor and the parts of the rotary damper that are mounted on the fastening element.

According to a further advantageous embodiment, the rotary damper according to the invention is characterized in that the flexible unit is connected with the bearing part and the rigid unit is connected to the articulated lever and the damper housing, thereby simplifying the integration of the strain wave transmission in the rotary damper according to the invention by being able to reliably initiate in the rotary damper according to the invention the initiation of the rotation movement of the articulated lever in relation to the fastening part onto the strain wave gear.

According to a further advantageous embodiment, the rotary damper according to the invention is characterized in that the flexible unit is designed as a pot of flexible material, the free edge of which having the external teeth and the bottom of which being connected to the bearing part or radial wall portion of the bearing part. This results in a stable and reliable integration of the flexible pot in the rotary damper according to the invention.

BRIEF DESCRIPTION OF THE DRAWING

Further advantages, features, and options of applications of the present invention will become apparent from the following description in conjunction with the exemplary embodiments illustrated in the drawings.

In the description, in the claims, and in the drawing, the terms used in the below list of reference signs, and associated reference signs are used. In the drawing:

DETAILED DESCRIPTION OF PREFERRED EMBODIMENTS

Figure 1:
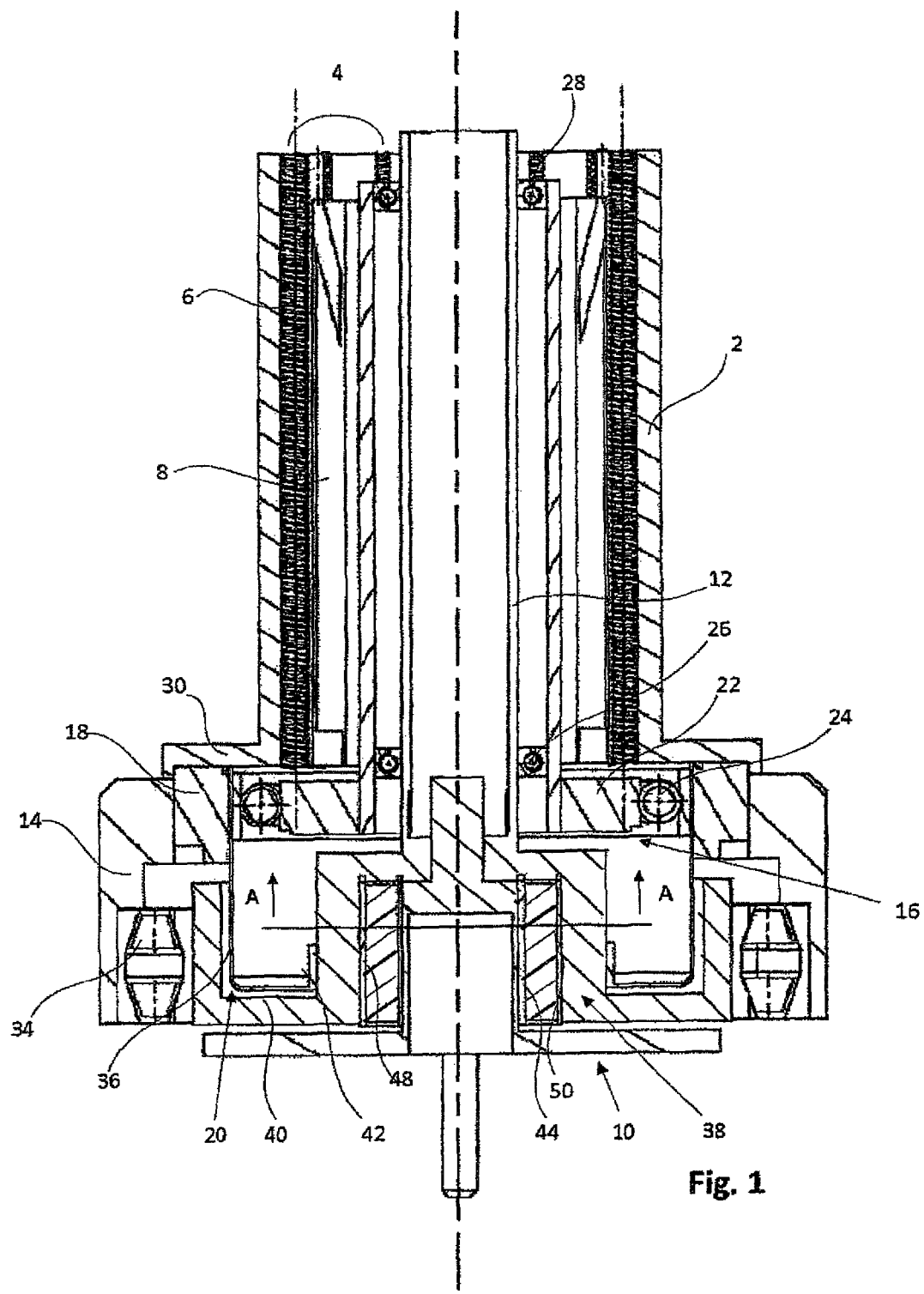
FIG. 1 is a sectional view of the rotary damper according to the invention along a plane in the longitudinal direction of the rotary damper.

According to FIG. 1, a rotary damper includes a damper housing 2 which surrounds an electromagnetic damper motor 4, which includes a stator 6 and a rotor 8, arranged in the stator 6, and means for generating a magnetic field at the rotor 8 and the stator 6.

The rotor 8 is rotatably supported on a bearing axle 12 in coaxial relationship with the damper housing 2, whereas the stator 6 is fixed to the damper housing 2. The rotor 8 may include a magnet assembly, whereas the stator 6 may include an energizable coil assembly, as is typical in such damper motors 4.

The rotary damper is to be fixed via a fastening part 10 to a body. An articulated lever 14 of the rotary damper is connected to the wheel suspension (not shown).

A strain wave gear 16 is provided for transmitting and/or converting a relative rotation movement between the masses to the damper motor 4 for vibration damping.

The strain wave gear 16 includes a rigid unit 18 having internal teeth, and a flexible unit 20 having external teeth, and an oval wave generator 22 which is rotatably mounted in the flexible unit 20 and which is able to deform the flexible unit 20 as it rotates, with both units 18, 20 being coupled to each other by a form fit via the teeth. A flexible rolling-contact bearing 24 is arranged between the flexible unit 20 and the wave generator 22. The rotor 8 of the strain wave gear 16 is rotatably supported on the bearing axle 12 via roller bearings 26, 28.

The rigid unit 18 is connected, on one hand, to the articulated lever 14, and, on the other hand, to a radial wall 30 of the damper housing 2, whereas the wave generator 22 is connected to the rotor 8 of the damper motor 4. The flexible unit 20 is connected to a bearing part 38, which is mounted on the articulated lever 14 via a roller bearing 34. To connect the flexible unit 20 with the bearing part 38, the flexible unit 20 includes an axial wall portion 36, a radial wall portion 40, and a further axial wall section 42 fastened to the bearing part 38.

The flexible unit 20 thus forms a flexible pot as component of the strain wave gear 16.

In the presence of a jouncing/rebounding of the wheel, the articulated lever 14 is pivoted relative to the fastening part 10 about an angle. As a result of this pivotal movement, a restoring force is generated by the damper motor 4. Due to the rotational speed, the rotary damper generates a damping force as a result.

FIG. 1 also shows the arrangement of the bearing part 48 and the fastening part 10 in the rotary damper, the support of the articulated lever 14 on the bearing part 38 via the roller bearing 34 as well as an elastomer bearing 44. The fastening part 10 can be secured to the body by bolts 32, of which only one is shown in the figures. Details of these parts of the rotary damper will be described hereinafter.

Figure 2:
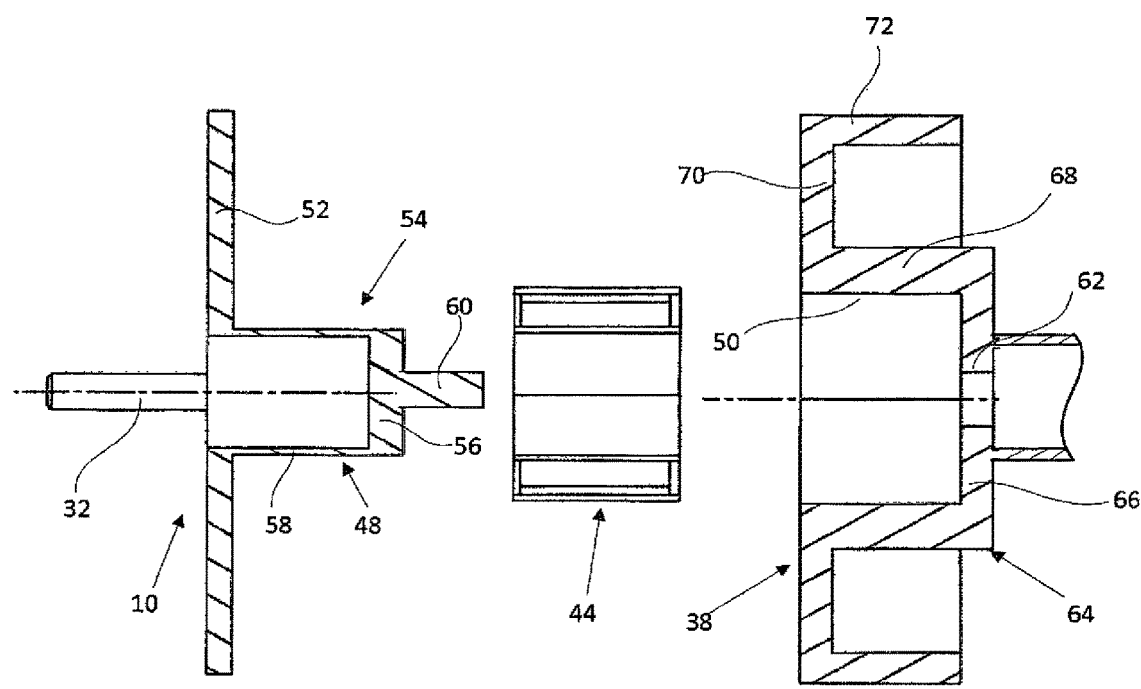
FIG. 2 is an exploded view of the arrangement of an elastomer bearing.

FIG. 2 shows an exploded view of the arrangement of the elastomer bearing 44 between the fastening part 10 and a bearing part 38. According to FIG. 2, the fastening part 10 has an outside bearing surface 48, and the bearing part 38 has an inside bearing surface 50, with the elastomer bearing 44 positioned between the inside bearing surface 50 of the bearing part 38 and the outside bearing surface 48 of the fastening part 10. In the assembled state, the elastomer bearing 44 lies thus between the bearing surfaces 48 and 50, as also shown in FIG. 1.

The fastening part 10 has a base plate 52 and a cup-shaped base plate extension 54 which projects axially from the base plate 52 and has a radial bottom portion 56 and an axial side wall portion 58, which in turn forms the outside bearing surface 48 of the fastening part 10. The bearing part 38 includes an axially extending bearing collar 64 with a radial bottom portion 66 and a side wall portion 68 which forms the inside bearing surface 50. The bearing part 38 further has a bearing portion 70 extending along the base plate 52 of the fastening part 10, and an axially extending bearing wall 72 which adjoins the bearing portion 70 and to which the articulated lever 14 is mounted via the roller bearings 74. Finally, the bearing part 38 also includes the bearing axle 12, connected to its bottom portion 66, for support of the damper motor 4.

Attached to the fastening part 10 is a pin 60, which protrudes to fit into a bore 62 that is provided in the bearing part 38 in centered relation to the axis X so as to realize an alignment of the fastening part 10 relative to the bearing part 38.

Figure 3:
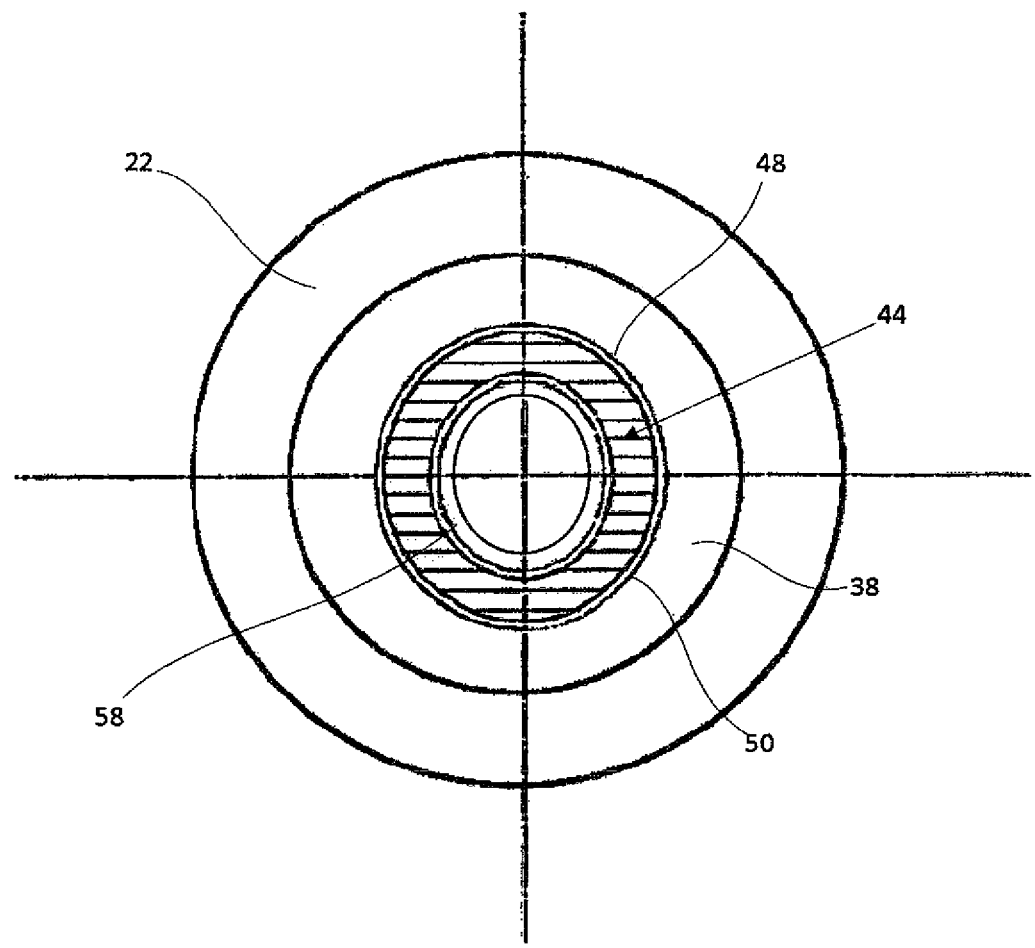
FIG. 3 is a sectional view of the elastomer bearing and of associated parts of the rotary damper according to the invention.

FIG. 3 is a sectional view of the elastomer bearing 44 and of associated parts of the rotary damper according to the invention, taken along the section A-A in FIG. 1. According to FIG. 3, the inside bearing surface 50 of the bearing part 38 and the outside bearing surface 48 of the wall 58 of the base plate extension 54 as well as the elastomer bearing 44 can be configured oval in cross section perpendicular to the axis X. As a result of this arrangement, the bearing surfaces 48, 50 for the elastomer bearing 44 ensures that the force, which acts in opposition to a pivoting of the bearing part 38 relative to the fastening part 10, progressively increases the further the oval surfaces of a non-deflected zero position between the fastening part 10 and the bearing part 38, in which the respective long and short axes of the ovals are superimposed, deviate. As a result, an effective torque support is realized.

The invention is not limited to the shown exemplary embodiments but includes rotary dampers which fall under the scope of the claims. In particular, types of damper motors other than electromagnetic damper motors and other types of gearings may be used as strain wave gear, without departing from the scope of the claims.

The invention claimed is:

1. A rotary damper, comprising:
   a damper housing defining an axis;
   a bearing part;
   an electromagnetic damper motor surrounded by the damper housing, said damper motor being arranged along the axis and supported by the bearing part;
   an elastomer bearing;
   a unitary fastening part configured for connection to a first mass and directly connected via the elastomer bearing to the bearing part for fastening the rotary damper to the first mass;
   an articulated lever configured for connection to a second mass and directly connected to the damper housing, said articulated lever being rotatably mounted relative to the bearing part; and
   a gearing configured for transmitting and/or converting a relative rotation movement between the first and second masses onto the damper motor for vibration damping.

2. The rotary damper of claim 1, wherein the fastening part has an outside bearing surface and the bearing part has an inside bearing surface, said elastomer bearing positioned between the inside bearing surface and the outside bearing surface.

3. The rotary damper of claim 1, wherein the fastening part includes a base plate and a cup shaped base plate extension which projects from the base plate in a direction of the axis, said base plate extension including a radial bottom portion and an axial side wall portion which forms the outside bearing surface.

4. The rotary damper of claim 3, wherein the bearing part includes an axially extending bearing collar with a radial base portion, an axial side wall portion which forms the inside bearing surface, a bearing portion extending along the base plate, and an axial bearing wall which adjoins the bearing portion, and further comprising a roller bearing for rotatably supporting the articulated lever on the bearing wall.

5. The rotary damper of claim 1, wherein the bearing part includes a bottom portion and a bearing axle, said bearing axle being connected to the bottom portion for support of the damper motor.

6. The rotary damper of claim 5, wherein the damper motor comprises a rotor rotatably mounted on the bearing axle in the damper housing in coaxial relation to the damper housing, and a stator secured to the damper housing.

7. The rotary damper of claim 2, wherein the inside and outside bearing surfaces and the elastomer bearing are oval in cross section perpendicular to the axis.

8. The rotary damper of claim 1, wherein the gearing is constructed in the form of a strain wave gear which includes a rigid unit having internal teeth, a flexible unit having external teeth, and an oval wave generator which is rotatably mounted in the flexible unit and which causes deformation of the flexible unit as it rotates, said rigid and flexible units being coupled to one another by a form fit via the internal and external teeth.

9. The rotary damper of claim 8, wherein the flexible unit is connected to the bearing part, and the rigid unit is connected to the articulated lever and to the damper housing.

* * * * *